Figure 1:
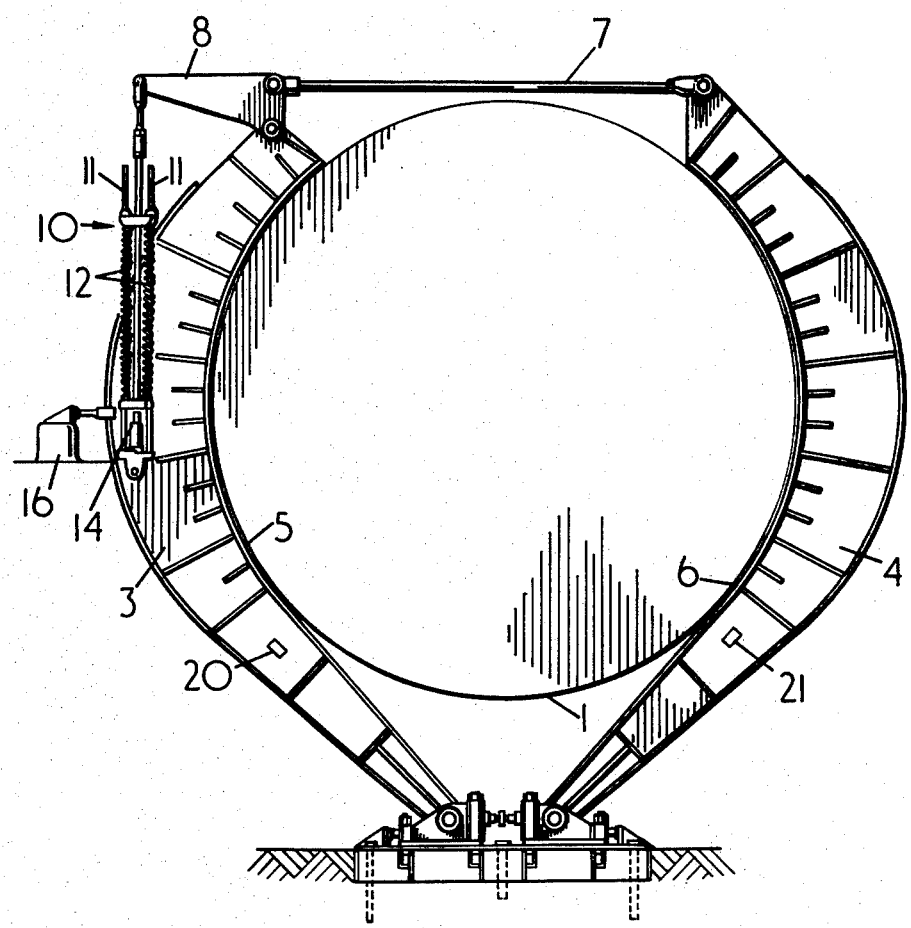

United States Patent [19]

Blake

[11] 4,234,063
[45] Nov. 18, 1980

[54] BRAKE EQUIPMENT

[75] Inventor: Donald F. Blake, Burton-on-Trent, England

[73] Assignee: Coal Industry (Patents) Limited, London, England

[21] Appl. No.: 905,926

[22] Filed: May 15, 1978

Related U.S. Application Data

[63] Continuation of Ser. No. 722,604, Sep. 13, 1976, abandoned.

[30] Foreign Application Priority Data

Oct. 28, 1975 [GB] United Kingdom ............... 44325/75

[51] Int. Cl.³ ........................ B60T 8/00; F16D 65/38
[52] U.S. Cl. ................................. 188/181 T; 73/9; 188/75; 188/156
[58] Field of Search ............ 188/1 A, 2 A, 75, 181 T, 188/156, 157; 244/111; 73/1 B, 1 C, 9, 130, 131; 318/203 R, 371

[56] References Cited

U.S. PATENT DOCUMENTS

| | | | |
|---|---|---|---|
| 1,702,515 | 2/1929 | Lindquist | 318/371 |
| 2,194,759 | 3/1940 | Logan | 318/371 |
| 2,992,860 | 7/1961 | Hirzel | 244/111 |
| 3,162,793 | 12/1964 | Mason | 318/371 |
| 3,415,115 | 12/1968 | Newell | 73/131 |
| 3,578,817 | 5/1971 | Eastcott | 303/16 |
| 3,578,819 | 5/1971 | Atkins | 188/181 |
| 3,594,721 | 7/1971 | Frenkel et al. | 188/1 A |
| 3,596,156 | 7/1971 | Davey et al. | 318/203 R |
| 3,711,162 | 1/1973 | Steinbrenner et al. | 188/181 T |
| 3,876,918 | 4/1975 | Kamuro et al. | 318/203 R |
| 3,993,270 | 11/1976 | Gallacher | 73/9 |

Primary Examiner—Edward R. Kazenske
Attorney, Agent, or Firm—James Creighton Wray

[57] ABSTRACT

Strain gauge devices are mounted on the brake shoe carrying levers of an underground mine winding engine to sense induced strain and effective braking force when the brake is applied. A summation unit adds outputs from strain gauges. Indicators are operated by the result to indicate the effective braking force. A comparator compares the result with predetermined desired braking levels. Controls prevent release of other brake devices until the effective braking force exceeds a preselected magnitude.

2 Claims, 2 Drawing Figures

BRAKE EQUIPMENT

This is a continuation of application Ser. No. 722,604, filed Sept. 13, 1976 now abandoned.

This invention relates to brake equipment.

In particular, although not exclusively, this invention relates to brake equipment for winding engines for underground mines.

It has been proposed to provide sensing means to sense when brake equipment on winding engines have been operated. Unfortunately, such a proposal has the disadvantage that in some conditions the brake equipment may have been operated but the brakes may not be effective, as for example, if a brake shoe is damaged or missing or if a lubricant material has been applied to the braked member or to the brake shoe.

An object of this invention is to provide brake equipment which tends to overcome or reduce the above mentioned disadvantage.

According to the present invention brake equipment comprises a brake assembly for engaging a brake member when the brake equipment is operated so as to tend to apply a braking force to the brake member, operating means for operating the brake assembly, and sensing means for sensing the effective braking force applied by the brake assembly and for deriving a signal indicative of the effective braking force should the sensed force be less than a preselected magnitude when the brake equipment is operated.

Conveniently, the brake assembly includes a brake shoe carried on a pivotally mounted lever which is urged towards the brake member by the operating means when the brake equipment is operated, the sensing means sensing the reaction between the brake member and the brake assembly when the brake equipment is operated.

Advantageously, the sensing means comprises strain sensitive means arranged to sense strain in the lever when the brake equipment is operated.

Preferably, the brake member is circular and in which case the brake assembly preferably comprises a further pivotally mounted lever arranged on the opposite side of the brake member to the first mentioned lever.

Conveniently, when the brake equipment is operated the two levers are arranged to act in calliper like manner, the strain sensitive means sensing the strain in both levers.

Conveniently, more than one pair of co-operating levers may be provided.

Preferably, the strain sensitive means comprises strain gauge devices associated with the levers, respectively.

Advantageously, signals from the strain gauge devices are fed to an electrical summation unit arranged to derive a signal indicative of the resultant sensed strain in the levers.

Preferably, the signal derived by the summation unit is fed to an indicator device arranged to indicate the effective braking force.

The signal is fed to a comparator unit for comparing the effective braking force against the desired braking force.

In the case of a winding enging having both electrical brake equipment and mechanical brake equipment (as defined above) control means are provided to ensure that the electrical brake equipment cannot be released until a desired effective mechanical braking force has been applied, the desired effective braking force being maintained above the first mentioned preselected magnitude.

Figure 2:
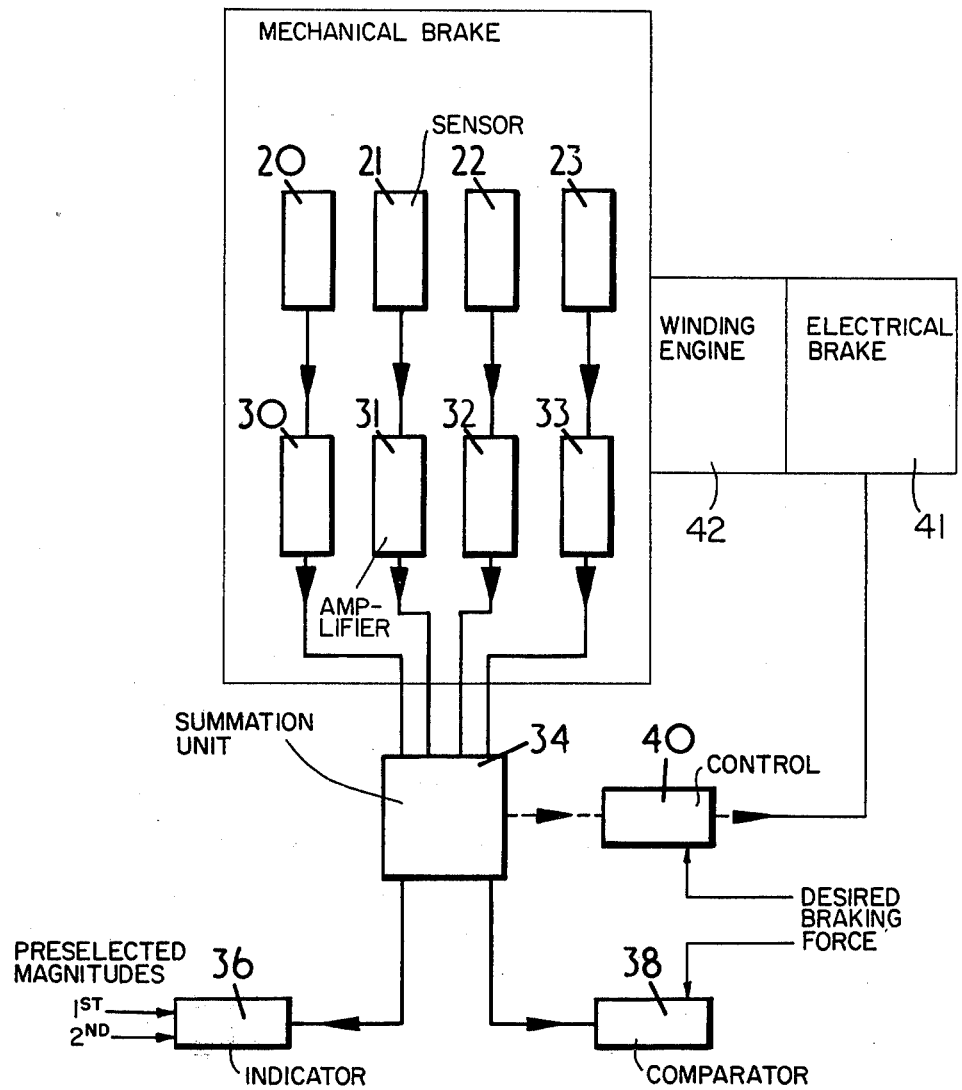

By way of example only, one embodiment of the present invention will be described with reference to the accompanying drawings in which:

FIG. 1 is a diagrammatic view of underground mine winder mechanical brake equipment; and FIG. 2 is a block circuit diagram of sensing means for sensing the effective braking force of the brake equipment of FIG. 1.

Referring to FIG. 1, an underground mine winder comprises a brake member or drum 1 arranged to rotate with a rope accommodating or drivably engaging drum (not shown). In use a mine cage is hauled at high speed up and down a vertical mine shaft between two vertically spaced levels. The winder is provided with brake equipment comprising a brake assembly including two co-operating pivotally mounted calliper levers 3 and 4 arranged on opposite sides of the brake drum 1 for engaging the brake drum when the brake equipment is operated. Brake shoes 5 and 6 are provided on the levers and extend around the brake drum 1. The levers are connected by brake operating means including a tie rod 7 pivotally connected to the lever 4 and to a triangular bracket 8 pivotally connected to the level 3. The triangular bracket 8 is also pivotally connected to an actuating mechanism 10 including a plurality of guide rods 11, springs 12 and a hydraulic piston and cylinder device 14. The end of the actuating mechanism remote from the triangular bracket 8 is anchored and the arrangement is such that the springs 12 normally urge the brake assembly into an applied position. The brake assembly is released by actuation of the piston and cylinder device 14. A stool arrangement 16 is provided to steady the levers when the brake equipment is operated.

The brake equipment also comprises strain sensing means including strain guage devices 20 and 21 mounted on the levers 3 and 4, respectively, to sense the strain in the levers when the brake equipment is operated. In FIG. 2 four strain guage devices 20, 21, 22 and 23 are shown, the devices 22 and 23 being mounted on the opposite side of the levers 3 and 4 to the devices 20 and 21 and, therefore, are not being seen in FIG. 1.

The derived signals from the devices 20, 21, 22 and 23 are fed via amplifiers 30, 31, 32 and 33 to an electrical summation unit 34 arranged to electrically sum the derived signals to derive a total signal indicative of the sensed strain in the levers 3 and 4 and, thus, indicative of the effective braking force of the brake equipment. It will be appreciated that when the brake equipment is operated and the brake assembly including the levers 3 and 4, and shoes 5 and 6 engages the brake drum 1 reaction thrusts are generated between the rotating brake drum and the brake assembly such that the strains induced in one lever 3 or 4 are different from the strains induced in the other lever 4 or 3. The magnitude of these induced strains is proportional to the effective braking force of the brake equipment. Thus, if a shoe is damaged or missing or a lubricant material is applied between the brake member and the shoes the effective braking force of the brake equipment is low and the induced strain would be proportionately low.

Thus, the resultant signal from the summation unit 34 will be proportional to the effective braking force of the brake equipment.

The signal from the summation unit is fed to a indicator device 36 arranged to indicate or warn a winder operator that the effective braking force is less than a preselected magnitude and that the mechanical braking equipment is not efficiently braking the brake drum 1. In addition the indictor device is arranged to indicate or warn the winder operator should the effective braking force exceed a further preselected magnitude.

Also the signal from the summation unit 34 is fed to a compartor unit 38 arranged to compare the effective braking force against the desired braking force.

The signal from the summation unit may be fed to control means 40 of a winding engine 42 provided with both electrical brake 41 equipment and mechanical brake equipment to ensure that electrical braking equipment is not released unless the effective braking force of the mechanical brake equipment as described above is not less than a preselected magnitude, the desired braking force being maintained above the preselected magnitude.

Signals from the strain sensitive means are fed to an electrical summation unit arranged to derive a signal indicative of the resultant sensed strain in the levers and thereby a signal indicative of the effective braking force.

The signal derived by the summation unit is fed to an indicator device arranged to indicate the effective braking force.

The derived signal is fed to a comparator unit for comparing the effective braking force against the desired braking force.

Control means are provided to ensure that the electrical brake equipment cannot be released until a desired effective mechanical braking force has been applied, the desired effective braking force being maintained above the preselected magnitude.

The signal derived by the summation unit is fed to an indicator device arranged to indicate the effective braking force. The derived signal is fed to a comparator unit for comparing the effective braking force against the desired braking force.

From the above description it can be seen that the present invention provides brake equipment for sensing that a desired effective braking force is achieved.

In other embodiments of the invention more than one pair of levers is provided.

In still further embodiments only one lever is provided.

In applications for winders having no electrical brake equipment the control means may cut out the winder drive.

I claim:

1. Brake equipment for an underground mine winder having electrical brake equipment and mechanical brake equipment, comprising control means for releasing the electrical brake equipment when effective braking force of the mechanical braking equipment exceeds a preselected desired braking force, the mechanical brake equipment having a circular brake member and an assembly on opposite sides of the circular brake member and arranged to act in a calliper-like manner, brake shoes carried on the assembly, and operating means connected to the assembly for urging the assembly inwardly whereby the brake shoes contact and brake the circular brake member and the underground mine winder, plural strain sensing gauge devices mounted on the assembly for sensing strain in the assembly when the mechanical brake equipment is operated and for deriving strain signals when strain is sensed, a summation unit connected to the strain sensing gauge devices for summing derived strain signals to derive a total sensed strain signal indicative of sensed strain in the assembly, which is an effective braking force signal proportional to effective braking force of the mechanical braking equipment, an indicator means connected to the summation unit for receiving the effective braking force signal therefrom, whereby the indicator means indicates a warning when the effective braking force signal is less than a first preselected magnitude or is greater in magnittude than a second preselected magnitude, a comparator connected to the summation means for receiving the effective braking force signal therefrom, a desired braking force signal connected to the comparator, whereby the comparator compares the effective braking force signal with the desired braking force preselected magnitude, the control means being connected to the summation unit, the desired braking force signal and to the electrical braking equipment for permitting release of the electrical braking equipment when the effective braking force exceeds the desired braking force preselected magnitude for ensuring that the electrical braking equipment is not released unless the effective braking force the greater than the desired braking force.

2. The brake equipment of claim 1 wherein the assembly includes levers, wherein the brake shoes are mounted on the levers, and wherein the strain sensing gauge devices are mounted on the levers.

* * * * *